United States Patent
Ushiyama et al.

(10) Patent No.: US 9,547,305 B2
(45) Date of Patent: Jan. 17, 2017

(54) DRIVE CONTROL APPARATUS

(71) Applicant: OMRON Corporation, Kyoto-shi (JP)

(72) Inventors: Takao Ushiyama, Ritto (JP); Akihiko Morikawa, Kyoto (JP); Toshinori Sato, Ritto (JP); Junichi Ueno, Otsu (JP)

(73) Assignee: OMRON Corporation, Kyoto-shi (JP)

( * ) Notice: Subject to any disclaimer, the term of this patent is extended or adjusted under 35 U.S.C. 154(b) by 469 days.

(21) Appl. No.: 13/777,207

(22) Filed: Feb. 26, 2013

(65) Prior Publication Data

US 2013/0241460 A1 Sep. 19, 2013

(30) Foreign Application Priority Data

Mar. 15, 2012 (JP) .................................. 2012-058277

(51) Int. Cl.
*G05B 23/02* (2006.01)
*G05B 11/01* (2006.01)
*G05B 19/4062* (2006.01)
*G05B 19/19* (2006.01)

(52) U.S. Cl.
CPC ....... *G05B 23/0286* (2013.01); *G05B 19/4062* (2013.01); *G05B 19/19* (2013.01); *G05B 2219/42306* (2013.01); *G05B 2219/42309* (2013.01); *G05B 2219/42314* (2013.01)

(58) Field of Classification Search
CPC . G05B 19/4062; G05B 19/19; G05B 23/0286; G05B 19/42306; G05B 19/42309; G05B 19/42314
USPC ........................... 318/565, 563, 560; 340/648
See application file for complete search history.

(56) References Cited

U.S. PATENT DOCUMENTS

| | | | | |
|---|---|---|---|---|
| 4,560,938 A | * | 12/1985 | Poumakis | ..................... 318/599 |
| 4,594,538 A | | 6/1986 | Schmitt | |
| 5,414,336 A | * | 5/1995 | Tsutsumi et al. | ............. 318/560 |
| 5,602,708 A | | 2/1997 | Felgenhauer | |
| 5,825,150 A | * | 10/1998 | Kachi | ................ G05B 19/4062 |
| | | | | 318/271 |

(Continued)

FOREIGN PATENT DOCUMENTS

| | | |
|---|---|---|
| CN | 101443718 A | 5/2009 |
| CN | 201674205 U | 12/2010 |

(Continued)

OTHER PUBLICATIONS

"International Standard IEC61800-5-2 safety requirements—Functional"; IEC First edition. (Jul. 2007).

*Primary Examiner* — Bentsu Ro
*Assistant Examiner* — Zemenay Truneh
(74) *Attorney, Agent, or Firm* — Mots Law, PLLC

(57) ABSTRACT

The operation state of a servo motor is monitored and output to a user before automatic termination of power to the motor. A servo system includes a servo motor and a safety unit. The safety unit cuts off electric power to the servo motor when at least one of a speed, a position, acceleration, an amount of movement, a movement direction, and torque of the servo motor is outside a first operation range. Furthermore, the safety unit outputs a warning when at least one of the speed, the position, the acceleration, the amount of movement, the movement direction, the torque is within the first operation range, but is outside a second operation range that is narrower than the first operation range. User controls allow reduced operation when outside the second operation range.

14 Claims, 8 Drawing Sheets

(56) References Cited

U.S. PATENT DOCUMENTS

| | | | |
|---|---|---|---|
| 7,068,002 B2* | 6/2006 | Tsutsui | G05B 19/19 318/260 |
| 2006/0142901 A1 | 6/2006 | Frankel et al. | |
| 2007/0192910 A1* | 8/2007 | Vu | B25J 5/007 700/245 |
| 2010/0030348 A1* | 2/2010 | Scherer | G05B 19/4062 700/70 |
| 2011/0241447 A1 | 10/2011 | Ando et al. | |

FOREIGN PATENT DOCUMENTS

| JP | H07-67373 A | 3/1995 |
|---|---|---|
| JP | H08-501200 A | 2/1996 |
| JP | 2001-202689 A | 7/2001 |
| JP | 2008-061477 A | 3/2008 |
| JP | 2011-114909 A | 6/2011 |
| JP | 2011-115025 A | 6/2011 |
| JP | 4817084 B2 | 11/2011 |

* cited by examiner

DRIVE CONTROL APPARATUS

CROSS REFERENCE TO RELATED APPLICATIONS

This application claims priority based on 35 USC 119 from prior Japanese Patent Application No. P2012-058277 filed on Mar. 15, 2012, entitled "DRIVE CONTROL APPARATUS", the entire contents of which are incorporated herein by reference.

TECHNICAL FIELD

The invention relates to a drive control apparatus, and particularly to a drive control apparatus that has a function of outputting a warning before cutting off supply of electric power to a drive unit.

RELATED ART

In the related art, a variety of safety systems have been proposed to secure safety in a production site and the like where operators and a variety of machines such as machine tools and industrial robots coexist.

Japanese Patent No. 4817084 discloses a motor drive system which performs speed reduction control or stop control of a motor that drives an industrial machine in an environment where a safety fence installed around the industrial machine opens (see paragraph 85 and others). Furthermore, Japanese Patent No. 4817084 also discloses an operation wherein supply of electric power to the motor is cut off when a parameter indicating a driving state of the motor deviates from an operation-monitoring pattern (see paragraph 97).

Furthermore, safety requirements in terms of requirements for safety motion functions, are stipulated in Part 5-2 of IEC61800 (hereinafter referred to as "IEC61800-5-2), published in July, 2007.

However, in the technologies disclosed in the documents described above, the supply of electric power to the motor is cut off without prior notification when the operating state of a drive unit such as a motor exceeds a predetermined range. Because of this, for example, the supply of electric power to the motor may be abruptly cut off, when an operator operates an apparatus by operating a switch or the like for checking or repair. When the supply of electric power to the motor is cut off, work may be interrupted because restarting the apparatus requires a specific time period. Therefore, preferably the supply of electric power to the motor is allowed to terminate. To do this, it is preferable that the operating state of the drive unit, such as the motor, is checked before cut off of the electric power so that preventive action can be taken before termination of electric power to the motor.

SUMMARY

The invention has been devised to alleviate the problems described above. An object of embodiments is to give notification of an operating state of a drive unit before cutting off supply of electric power to the drive unit.

Some embodiments, provide a drive control apparatus including a detection unit that detects at least one of a speed, a position, acceleration, an amount of movement, a movement direction and torque, as a physical parameter indicating a movement of a drive unit, and a cut off unit that cuts off supply of electric power to the drive unit when the detected physical parameter is outside a first range ranging from a first upper limit to a first lower limit. The drive control apparatus may output a warning when the detected physical parameter is within the first range and additionally is outside a second range ranging from a second upper limit to a second lower limit, narrower than the first range, with a signal from the detection unit as an input.

According to another aspect, the drive control apparatus may switch between a time period of effective monitoring of the physical parameter and a time period of non-effective monitoring of the physical parameter, and output the warning during the period of time for which the monitoring of the physical parameter is effective.

According to still another aspect, the drive control apparatus may output the warning as a warning signal.

According to yet another aspect, the drive control apparatus may output the warning as at least one of light and sound.

According to yet another aspect, the warning signal may be at least one of a physical signal and a logical signal.

According to yet another aspect, the drive control apparatus may further include a control unit that controls the drive unit. The warning signal may be output to the control unit. The control unit may limit operation of the drive unit in comparison with a state in which the drive unit is operated before receiving the warning signal, while permitting the drive unit to operate, after receiving the warning signal.

According to yet another aspect, the drive control apparatus may further include a display device that receives and displays the warning signal.

According to yet another aspect, the drive control apparatus may set the second range according to a user operation.

The drive control apparatus may output warning that corresponds to an upper limit and to a lower limit of the second range.

The warning indicates whether at least one of the speed, the position, the acceleration, the amount of movement, the movement direction, and the torque of the drive unit is outside the second range, narrower than the first range. This occurs before at least one of the speed, the position, the acceleration, the amount of movement, the movement direction, and the torque of the drive unit is outside the first range and causes termination of electric power to the drive unit. Because of this, it may be notified that the physical parameter indicating the operated state of the drive unit approaches the upper limit or the lower limit of the first range, before electric power to the drive unit is terminated.

DETAILED DESCRIPTION

Figure 1:
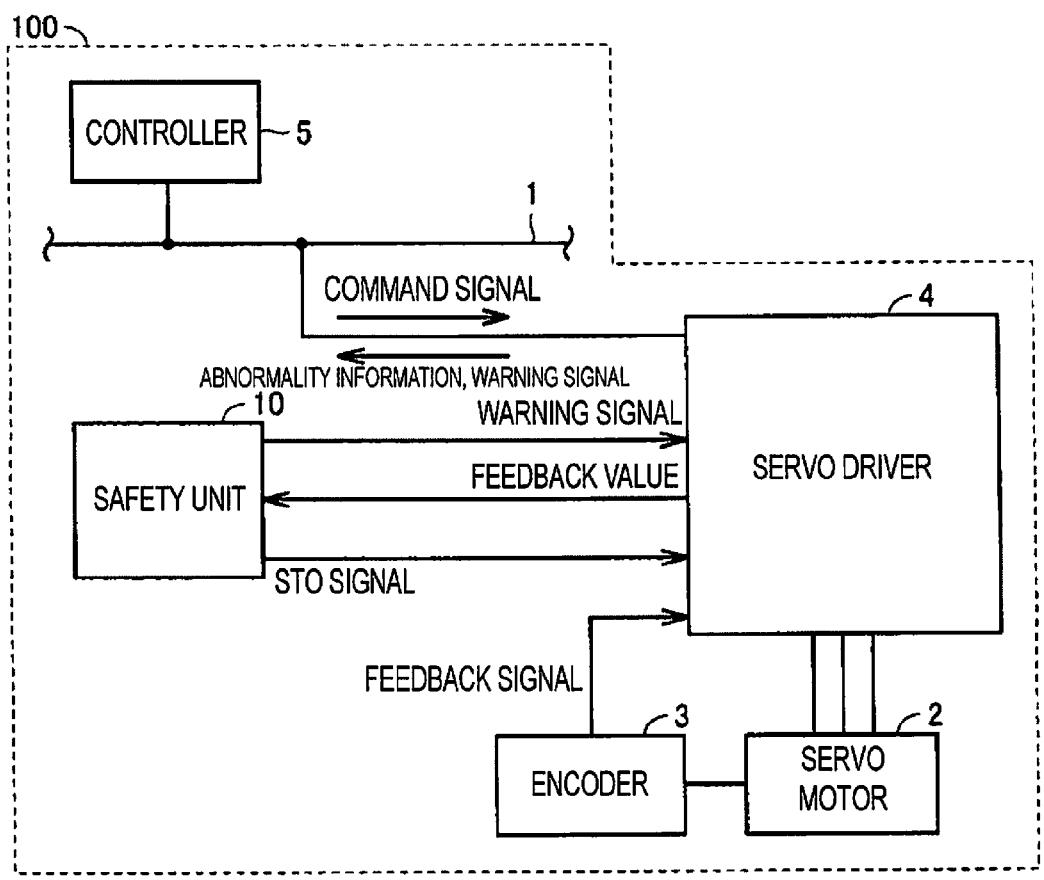
FIG. 1 is a schematic of a servo system according to an embodiment.

An embodiment is described below in detail referring to the drawings. Like reference numerals are given to the same or equivalent parts and their respective descriptions may not be repeated.

FIG. 1 is a schematic illustrating servo system 100 according to an embodiment. Servo system 100 is used as a system for driving a variety of mechanical apparatuses (for example, an arm of an industrial robot, not shown) as illustrated in FIG. 1. Servo system 100 includes network 1, servo motor 2, encoder 3, servo driver 4, controller 5, and safety unit 10.

Servo motor 2, for example, is an AC servo motor. Encoder 3 Encoder 3 is attached to servo motor 2 in order to detect a physical parameter that indicates an operating state of servo motor 2. Encoder 3 Encoder 3 generates a feedback signal that indicates the detected physical parameter and transmits that feedback signal to servo driver 4. The feedback signal, for example, includes information of a rotation position (an angle) of a rotation shaft of servo motor 2, information of a rotation speed of the rotation shaft, and other information. That is, according to the present embodiment, the rotation position and the rotation speed of the rotation shaft of servo motor 2 are detected as the physical quantities that indicate the operating state of servo motor 2. In addition, acceleration, an amount of change (an amount of movement), a change direction (a movement direction) and others may be detected in addition to or instead of the rotation position and the rotation speed. Moreover, torque of servo motor 2 may be detected by providing a torque detection device independently of encoder 3.

A general incremental type encoder or an absolute type encoder may be applied to encoder 3. In addition, a variety of encoders or resolvers may be used as encoder 3, such as an encoder that is an part of servo motor 2, a resolver that is part of servo motor 2, an external encoder, an external resolver, a proximity sensor and a gear, and a linear encoder. In addition, the type of encoder 3 is not limited to that described above. Furthermore, electric current flowing through servo motor 2 may be detected by providing an ammeter, thus the rotation speed of servo motor 2 may be inferred from the detected electric current. Furthermore, the torque of servo motor 2 may be calculated from the detected electric current.

Servo driver 4 receives a command signal from controller 5 via network 1, and receives the feedback signal output from encoder 3. Servo driver 4 drives servo motor 2, based on the command signal from controller 5, and the feedback signal from encoder 3. Furthermore, servo driver 4 transmits error data indicating an internal abnormality to controller 5 over network 1.

Servo driver 4 sets a command value relating to operation of servo motor 2, based on the command signal from controller 5. Furthermore, servo driver 4 drives servo motor 2 in such a manner that servo motor 2 operates according to the command value. Specifically, servo driver 4 controls drive electric current flowing through servo motor 2 according to that command value.

In addition, servo driver 4 transmits a feedback value obtained from the feedback signal to safety unit 10. As one example, the feedback value described above is the rotation speed of servo motor 2, but the feedback value is not limited to this value, and may be the amount of change (the movement amount), the rotation position, the acceleration, the torque, the change direction (movement direction), and other measured parameters.

Furthermore, servo driver 4 stops output of the torque by servo motor 2, when a STO signal as a stop signal is inputted to servo driver 4. Specifically, when the STO signal is inputted to servo driver 4, servo driver 4 stops supply of electric power to servo motor 2.

Additionally, an external interruption apparatus, provided separately from servo driver 4 may carry out the function of terminating electric power to servo driver 4.

For example, controller 5, which includes a programmable controller (PLC), a position control unit and others, is configured to control servo motor 2 and thus transmits the command signal for drive-control (for example, positioning control and others) of servo motor 2.

Furthermore, according to the embodiment, controller 5 receives a warning signal, described below, from safety unit 10, and thereafter, limits operation of servo motor 5, in comparison with a state in which servo motor 5 is operated before receiving the warning signal, while permitting the operation of servo motor 5. More specifically, servo motor 5 is driven in a state in which at least one of the rotation speed, the acceleration, the possible range of movement (the possible amount of movement, torque and change in direction of movement) of servo motor 5 is decreased. Here, the word "limit" may be construed to mean any action that stops servo motor 5 by decreasing the rotation speed of servo motor 5 to zero.

Safety unit 10 generates the STO signal described above and transmits the STO signal to servo driver 4 when the physical parameter, indicated by the feedback value transmitted from servo driver 4, which indicates the operating state of servo motor 2, is outside a predetermined first operation range, in a state in which a monitoring function is made effective.

Furthermore, safety unit 10 outputs a warning when the physical parameter indicating the operating state of servo motor 2 is within the first operation range described above, and additionally is outside a second operation range narrower than the first operation range. As one example, the warning is output as a warning signal toward controller 5. For example, the warning signal is transmitted from safety unit 10 towards controller 5 via servo driver 4. The warning signal is at least one of a physical signal and a logical signal. More specifically, the warning signal is outputted as an external output, an interface (I/O map bits of controller 5 or safety controller 50 described below), or a communication message. Furthermore, the form of the warning signal is not limited to these.

In addition, the warning may be output as light via an LED (a Light Emitting Diode) or an LCD (a Liquid Crystal Display), and may be output as sound from a speaker. Furthermore, a displaying device, which receives the warning signal and displays the warning, may be provided.

Figure 2:
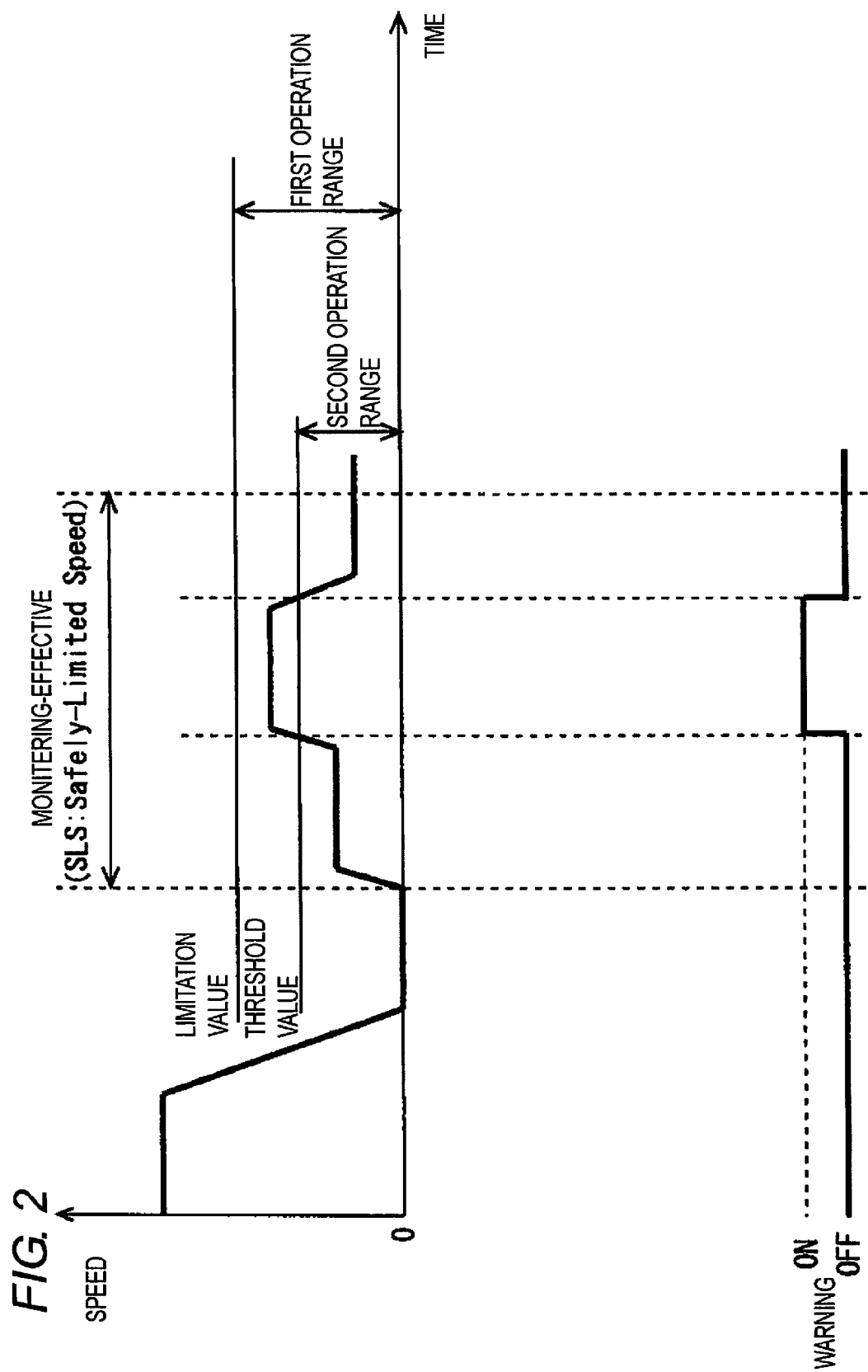
FIG. 2 is a (first) diagram illustrating an operation range of a rotation speed of a servo motor.

One example when the detected physical parameter of servo motor 2 is defined as the rotation speed is described in FIG. 2. In FIG. 2, it is assumed that the monitoring function is implemented during the interval of time t1 to time t2.

As illustrated in FIG. 2, when an absolute value of the rotation speed of servo motor 2 exceeds a threshold value, during the interval from time t1 to time t2, the warning is output because it is determined that the rotation speed of servo motor 2 is outside the second operation range. That is, only the upper limit of the second operation range is determined in FIG. 2. Furthermore, when the absolute value of the rotation speed of servo motor 2 exceeds a limitation value greater than the threshold value, the STO signal is output because it is determined that the rotation speed is outside the first operation range.

Figure 3:
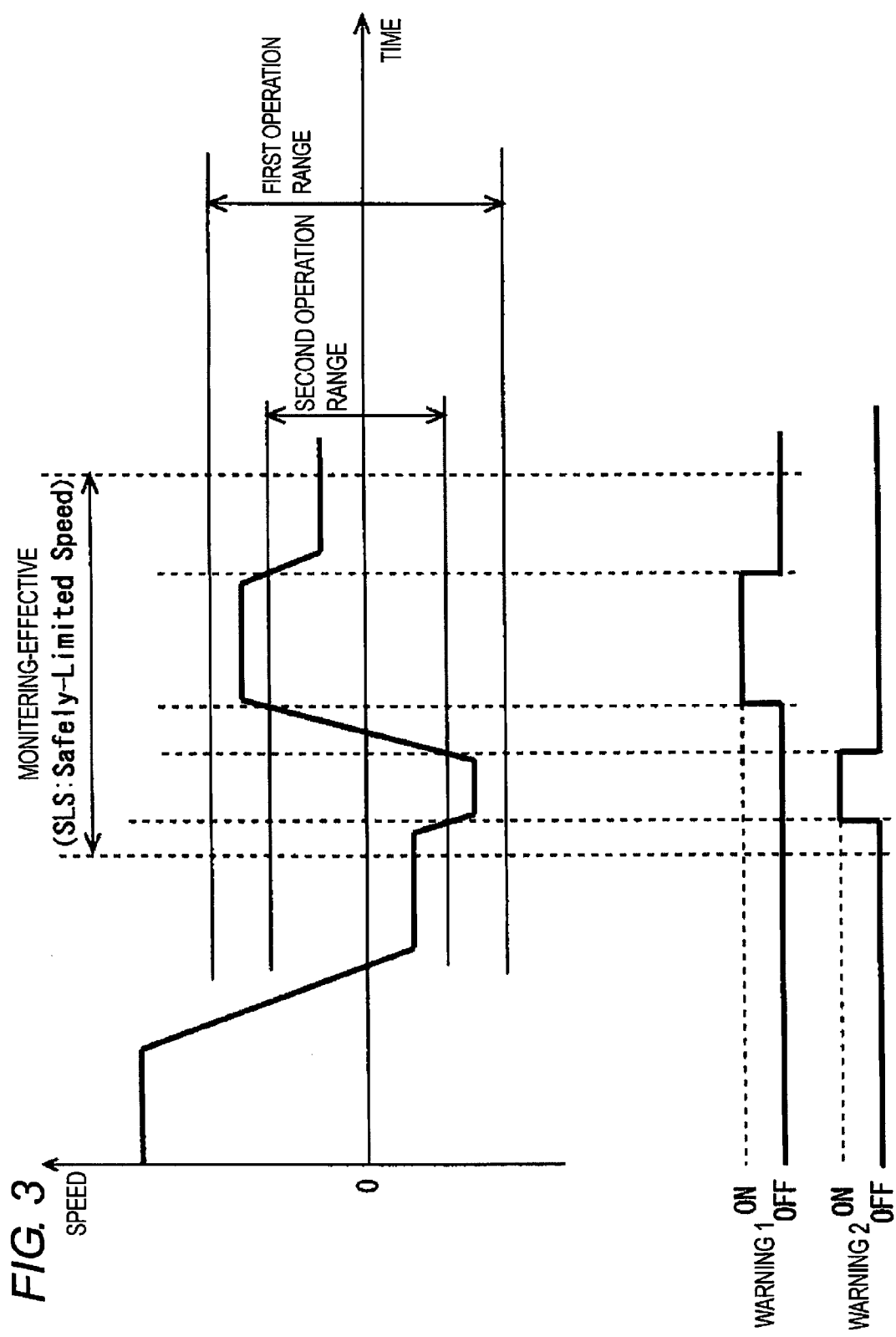
FIG. 3 is a (second) diagram illustrating the operation range of the rotation speed of the servo motor of FIG. 2.

The warning may be output, in a case where, as illustrated in FIG. 3, the upper limit and the lower limit of the second operation range (and the first operation range) are set and the rotation speed of servo motor 2 exceeds the upper limit of the second operation range, or falls below the lower limit of the second operation range. At this time, the warning that corresponds to each of the upper limit and the lower limit of the second operation range may be output. That is, the warning may be output in such a manner to distinguish between the case where the rotation speed of servo motor 2 exceeds the upper limit of the second operation range and the case where the rotation speed of servo motor 2 falls below the lower limit of the second operation range. For example, information indicating that the rotation speed exceeds the upper limit, or information indicating that the rotation speed falls below the lower limit is included in the warning signal.

Furthermore, in a case where the rotation speed of servo motor 2 exceeds the upper limit of the second operation range and in a case where the rotation speed of servo motor 2 falls below the lower limit of the second operation range, light emitting patterns of the LED or the LCD may be made different from each other, and change patterns of the sound produced from the speaker may be different from each other.

Furthermore, in FIG. 3, the upper limit of the second operation range (and the first operation range) is set to a positive value, and the lower limit is set to a negative value.

Figure 4:
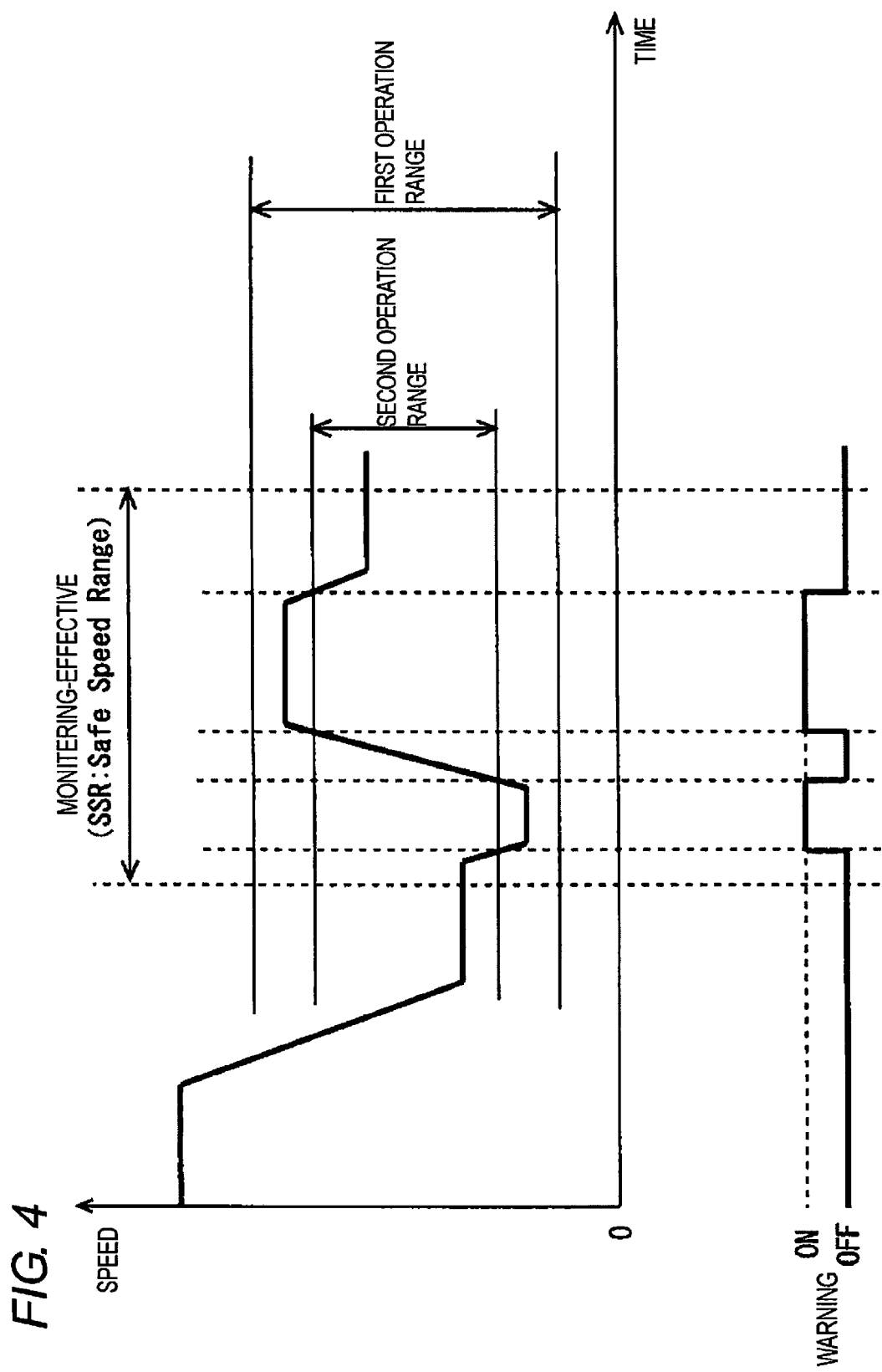
FIG. 4 is a (third) diagram illustrating the operation range of the rotation speed of the servo motor.

As illustrated in FIG. 4, the upper limit and the lower limit of the second operation range (and the first operation range) are both set to positive values. In this case, the warning may be output in such a manner to distinguish between the case where the rotation speed of servo motor 2 exceeds the upper limit of the second operation range and the case where the rotation speed of servo motor 2 falls below the lower limit of the second operation range.

Figure 5:
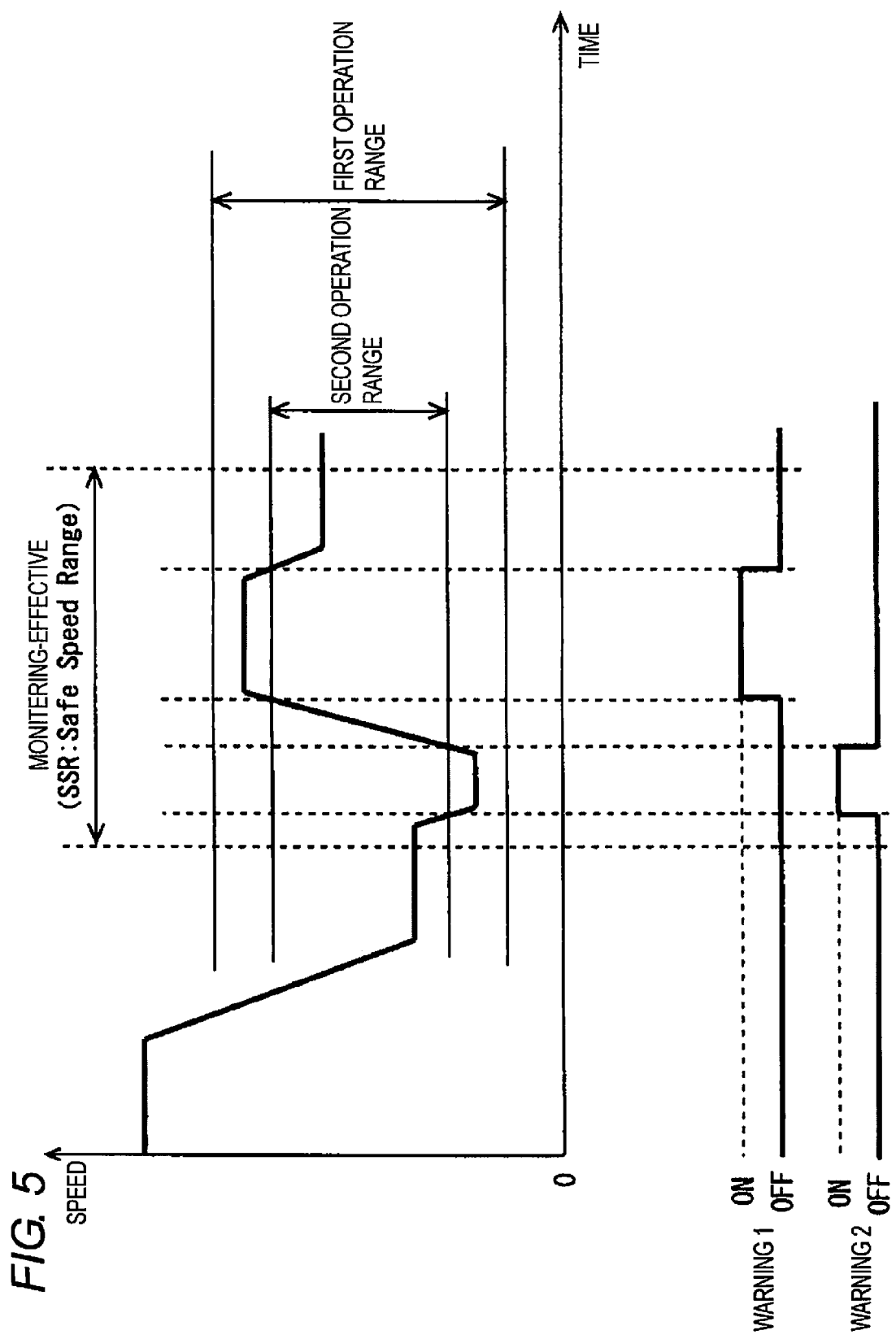
FIG. 5 is a (fourth) diagram illustrating the operation range of the rotation speed of the servo motor.

On the other hand, as illustrated in FIG. 5, the warning may be output in such a manner as to distinguish between the case where the rotation speed of servo motor 2 exceeds the upper limit of the second operation range and the case where the rotation speed of servo motor 2 falls below the lower limit of the second operation range.

Furthermore, as illustrated in FIGS. 4 and 5, the upper limit and lower limit of the second operation range (and the first operation range) are both set to negative values. Furthermore, in the examples illustrated in FIGS. 2 to 5, at least one of the rotation position, the acceleration, the amount of change (the amount of movement), the change direction (the movement direction) and the torque may be used instead of or in addition to the rotation speed.

According to the present embodiment, safety unit 10 is configured to possibly correspond to the functions stipulated in IEC61800-5-2, international standards, described below.

SS2: Safe Stop 2
SOS: Safe Operating Stop
SLA: Safely-Limited Acceleration
SAR: Safe Acceleration Range
SLS: Safely-Limited Speed
SSR: Safe Speed Range
SLT: Safely-Limited Torque
STR: Safe Torque Range
SLP: Safely-Limited Position
SLI: Safely-Limited Increment
SDI: Safe Direction
SMT: Safe Motor Temperature.

Safety unit 10 is configured to possibly correspond to SMS (Safe Maximum Speed) function that has not yet been stipulated as a standard.

Figure 6:
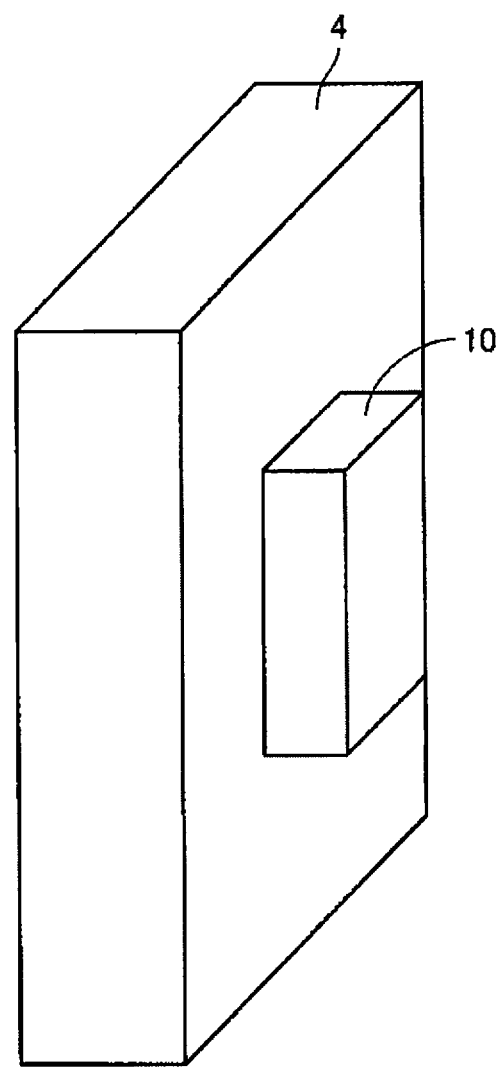
FIG. 6 is a diagram of an example of a combination of a servo driver and a safety unit, as illustrated in FIG. 1.

FIG. 6 is a diagram illustrating one example of combinations of servo driver 4 and safety unit 10 illustrated in FIG. 1. Servo driver 4 and safety unit 10 according to the present embodiment are realized as an individual apparatus, as illustrated in FIG. 6. Safety unit 10, although not illustrated, not only receives the command value and the feedback value from servo driver 4, but transmits the STO signal to servo driver 4, by being connected to servo driver 4 via a connection part, such as a connector and a cable.

Safety unit 10, as an optional unit of servo driver 4, may be inserted into a slot of servo driver 4, or may be attached sideways to servo driver 4.

Safety unit 10 and servo driver 4 may be integrated into one piece. For example, servo driver 4 and safety unit 10 may be put into one casing. Safety unit 10 may be configured as a monitoring unit that is independent of servo driver 4. Safety unit 10 may be built into a motion controller.

Figure 7:
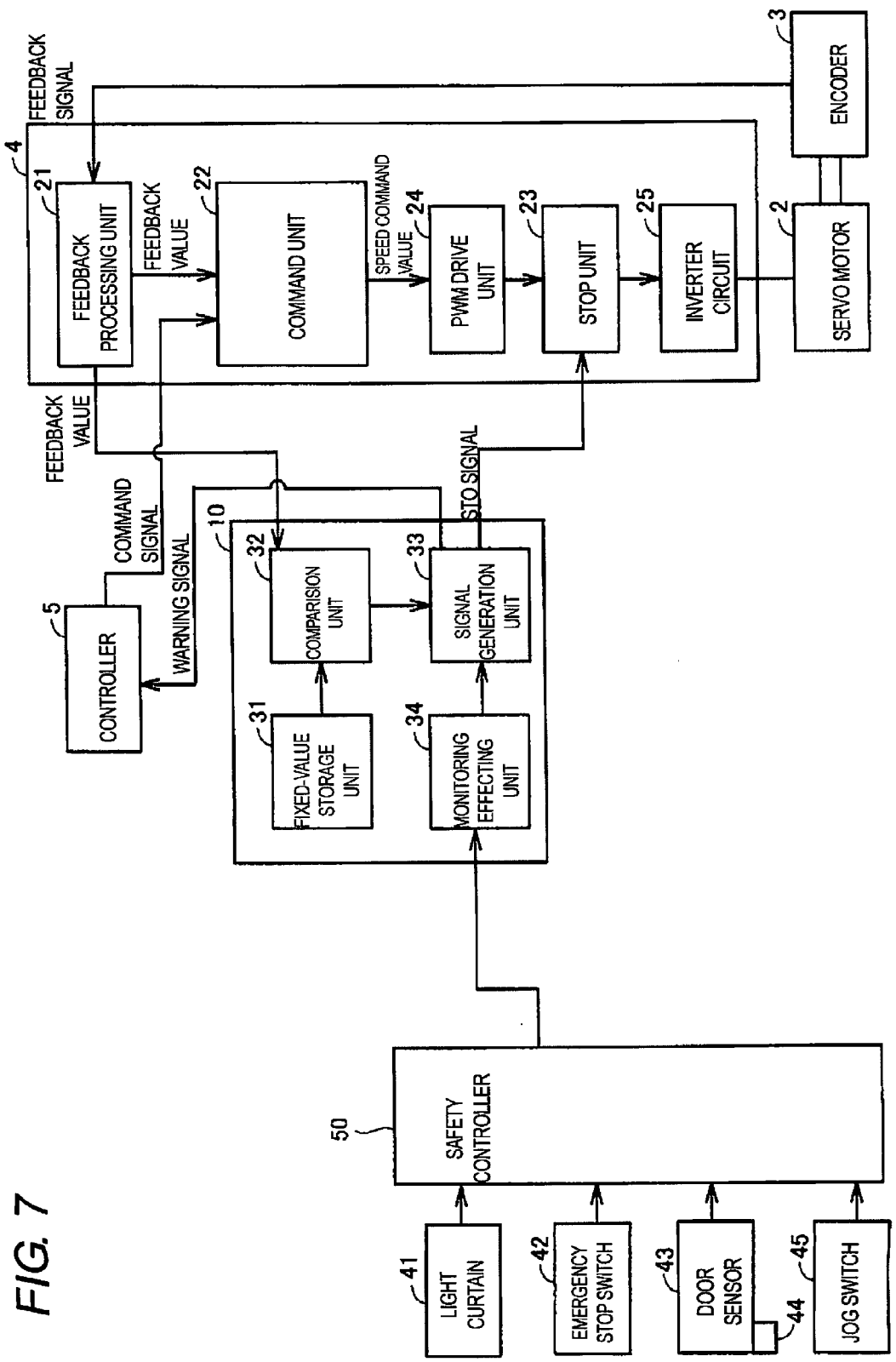
FIG. 7 is a functional block diagram of configurations of the servo driver and the safety unit illustrated in FIG. 1.

FIG. 7 is a functional block diagram for describing configurations of the servo driver and the safety unit illustrated in FIG. 1. Servo driver 4 includes feedback processing unit 21, command unit 22, stop unit 23, PWM (Pulse Width Modulation) drive unit 24 and inverter circuit unit 25, as illustrated in FIG. 7.

Feedback processing unit 21 generates the feedback value, based on the feedback signal from encoder 3. For example, in a case where a pulse is outputted from encoder 3, feedback processing unit 21 calculates the rotation speed of servo motor 2 by counting the pulses, and generates the feedback value including the value indicating that speed. The feedback value may include not only the rotation speed of servo motor 2, but also the value relating to the rotation position (the angle) of the rotation shaft of servo motor 2.

Feedback processing unit 21 transmits the feedback value to command unit 22 and outputs the feedback value to outside of servo driver 4. The feedback value outputted from servo driver 4 is transmitted to safety unit 10.

Command unit 22 receives the command signal from controller 5 and receives the feedback value from feedback processing unit 21. Command unit 22 generates the command value for performing position control, speed control and torque control by feedback control based on the command signal and the feedback value. Furthermore, the speed control is described below. Command unit 22 generates a speed command value by the feedback control based on the command signal and the feedback value (the rotation speed). The speed command value is transmitted to stop unit 23.

Stop unit 23 stops inverter circuit unit 25 by preventing the PWM signal from electrically passing, in a case of receiving the STO signal from safety unit 10. Because of this, the supply of electric power to servo motor 2 is cut off, and thus the output of the torque by servo motor 2 is stopped. On the other hand, in a case where the STO signal is not input to stop unit 23, stop unit 23 enables the speed command value, output from command unit 22, to pass.

Inverter circuit unit 25 receives a signal from a PWM drive unit 24 via stop unit 23. Inverter circuit unit 25, although not illustrated, is configured from a semiconductor switching element such as an IGBT (Insulated Gate Bipolar Transistor). The PWM drive unit 24 generates a signal for turning on and off the switching element according to the PWM technique, based on the speed command value for the drive unit 24, and inverter circuit unit 25 turns on and off the switching element, based on a signal for inverter circuit unit 25. Because of this, electric power is supplied to servo motor 2, and servo motor 2 is driven according to the speed command value. On the other hand, in a case where stop unit 23 operates, the signal from the PWM drive unit 24 remains in an OFF state. Because of this, the supply of electric power to servo motor 2 is cut off and thus servo motor 2 stops. Since servo motor 2 stops, output of the torque from servo motor 2 stops.

Safety unit 10 includes fixed-value storage unit 31, comparison unit 32, signal generation unit 33, and monitoring effecting unit 34. Fixed-value storage unit 31 stores in advance the first operation range and the second operation range described above.

The first operation range and the second operation range may be set by a user. For example, the user may set the upper limit and the lower limit of the first operation range and the upper limit and the lower limit of the second operation range, via a user interface that is displayed on a computer. Furthermore, the first operation range and the second operation range are not limited to this setting method, and additionally, may be set using a variety of methods, such as by operating a switch provided to safety unit 10.

Comparison unit 32 receives the feedback value from servo driver 4. Comparison unit 32 compares the feedback value with the first operation range and the second operation range, and outputs that comparison result.

Signal generation unit 33 determines the feedback value, that is, whether the physical parameter indicating the operating state of servo motor 2 is outside the first operation range, and whether the physical parameter is outside the second operation range, based on the output of comparison unit 32.

As one example, in a case where the monitoring function is made effective by the signal input from safety controller 50, and the operating state of monitoring effecting unit 34 is set to a monitoring-in-progress state, signal generation unit 33 determines whether the physical parameter indicating the operating state of servo motor 2 is outside the first operation range, and whether the physical parameter is outside the second operation range. As described above, when the physical parameter indicating the operating state of servo motor 2 is outside the first operation range, the STO signal is generated and is output to servo driver 4. When the physical parameter indicating the operating state of servo motor 2 is within the first operation range, but is outside the second operation range, the warning signal is generated and is output to controller 5.

In a case where the monitoring function of monitoring effecting unit 34 is non-effective, signal generation unit 33 does not generate the STO signal even though the physical parameter indicating the operating state of servo motor 2 is outside the first operation range, and does not generate the warning signal even though the physical parameter is outside the second operation range.

Monitoring effecting unit 34 outputs a flag, indicating whether the monitoring function is effective or non-effective, to signal generation unit 33. In a case where monitoring effecting unit 34 is monitoring (that is, in a case where the monitoring function is effective), the flag becomes 0 (zero), and in a case where the monitoring function of monitoring effecting unit 34 is non-effective (in a case where monitoring effecting unit 34 is not monitoring), the flag becomes 1.

Signals, which come from light curtain 41, emergency stop switch 42, door sensor 43 (including key 44 attachable to and detachable from a main body of door sensor 43), jog switch 45 and others, are input to safety controller 50, and the signals are input from safety controller 50 to monitoring effecting unit 34. The input signals from safety controller 50 to monitoring effecting unit 34 are emergency stop (E-STOP), safety stop 1 (SS1), safety stop 2 (SS2), SOS, SLS, and others.

Jog switch 45 is, for example, a switch that the user operates in order to manually operate servo motor 2. When jog switch 45 is operated, servo motor 2 is driven only for that period of time and the SLS signal is input to monitoring effecting unit 34, thereby making the monitoring function effective.

Figure 8:
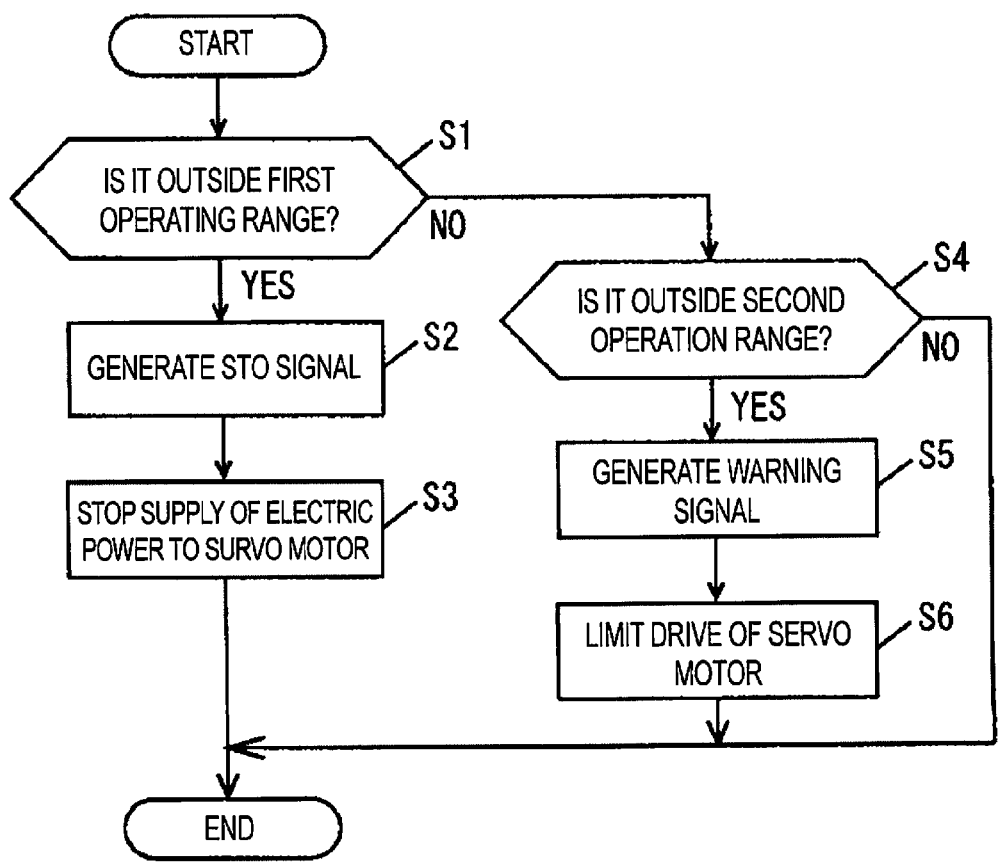
FIG. 8 is a flow chart of processing steps performed by the servo system.

The processing performed by servo system 100 is described in reference to FIG. 8. This processing is repeatedly performed, for example, with a control period (not limited to a specific period, but, for example, 2 msec), for which the command value is generated.

In Step (hereinafter abbreviated to S) 1, safety unit 10 determines whether or not the feedback value transmitted from servo driver 4 is outside the first operation range.

When the feedback value is outside the first operation range (YES in S1), the STO signal is generated in S2. Thereafter, the supply of electric power to servo motor 2 is cut off in S3.

When the feedback value is within the first operation range (NO in S1), whether the feedback value is outside the second operation range is determined in S4. When the feedback value is outside the second operation range (YES in S4), the warning signal is generated in S5. Thereafter, in S6, while the driving of servo motor 2 is permitted, the driving of servo motor 2 is limited in comparison with the state in which servo motor 2 is operated before the warning signal is generated.

Furthermore, the processing in Steps S1 to S6 is not limited to that performed according to the sequence illustrated in FIG. 4, and a change may be appropriately made in the sequence. Moreover, the processing in Steps S1 to S6 may be performed in parallel.

As described above, according to the present embodiment, a warning can be made before the physical parameter indicating the operating state of servo motor 2 is outside the first operation range and thus the supply of electric power to servo motor 2 is cut off. Such the warning indicates that the physical parameter indicating the operating state of servo motor 2 is outside the second operation range, which is narrower than the first operation range. Because of this an alert may issue that the physical parameter indicating the operating state of servo motor 2 approaches the upper limit or the lower limit of the first operation range, before termination of power to servo motor 2.

Because of this, for example, the operation may be stopped by a user's program such as a ladder before the supply of electric power to servo motor 2 is cut off, or may be stopped by the user releasing a hand operated jog switch 45 before the supply of electric power to servo motor 2 is cut off. Consequently, the frequency with which the supply of electric power is cut off may be decreased. This allows fewer resets due to power termination. Consequently, the number of times that work is interrupted, for example, at the maintenance time, may be decreased thereby improving work efficiency.

Moreover, a manufacturing line needs to be stopped for repair for a long time, because in a case where the STO signal is generated in an apparatus in which the STO signal is rarely generated under a usual operation condition, the apparatus is considered as in trouble. However, apparatus deterioration may be detected by generating the warning signal before generating the STO signal, and for example the part may be replaced with a new part, with a certain sufficient degree of time secured, before an apparatus breakdown occurs. Because of this, the manufacturing line does not have to be stopped for a long time, and preventive maintenance may be realized.

Furthermore, through the use of the generation of the warning signal, measures may be taken in advance, before the STO signal is generated and thus the apparatus is stopped, by detecting the state in which a malfunction may occur at any moment because there is no sufficient room to resistance to noise, and the state in which the apparatus may operate in an unintended manner at any moment because the apparatus is in operation with the setting wrong.

Furthermore, in the operating state in which the warning signal is generated, a variety of safety standards may be satisfied, which relate to the position, the speed, the torque, the temperature and others of movable parts of the apparatus. Because of this, even though the apparatus continues to operate also after the warning signal is generated, efficient maintenance may be performed while ensuring safety. During maintenance, it may be determined whether the warning signal is generated using the two or more threshold values that are different in size from each other. Then, the apparatus may be enabled to operate until the physical parameter indicating the operating state of the drive unit exceeds one threshold value and may be stopped when the physical parameter exceeds the other threshold value.

Furthermore, in an apparatus equipped with an external brake for the drive unit at the time of stopping the drive unit, such as the servo motor, the operation speed of the drive unit may be decreased before the STO signal is generated by the excessive operation speed of the drive unit, by lightly controlling the drive unit after the warning signal is generated.

Furthermore, the threshold value, which is used to determine whether or not the warning signal is generated, is set as a percentage of the value of the limit, such as the upper limit and the lower limit, and thus a warning range may be automatically changed by linking the threshold value when the value of the limit is changed. For example, when the upper limit value is increased with respect to the operation speed of the apparatus, the warning range is automatically broadened in which the warning signal is generated.

Furthermore, when it is determined whether the warning signal is generated using the two or more threshold values, different in size, the preventive maintenance may be performed on the apparatus, in such a manner that the part is replaced with a new part when the physical parameter indicating the operating state of the drive unit is between one threshold value and the other threshold value, a replacement part is secured (an order for the replacement is placed) when the physical parameter exceeds the one threshold value, or the part is replaced with a new part when the physical parameter exceeds the other threshold value.

Furthermore, if the operation speed and the torque of the drive unit are automatically decreased (limited) when it is determined whether the warning signal is generated using the two or more threshold values, different in size, and the physical parameter indicating the operated state of the drive unit exceeds the one threshold value, efficient maintenance may be performed while securing safety.

It has to be considered that the embodiment disclosed so far, is exemplified in all respects and therefore is not restrictive. The scope of the present invention is determined by the scopes of the claims, not by what is described above, and is intended to include all modifications within the scope of the claims and the meanings and the scope of their equivalents.

What is claimed is:

1. A drive control apparatus of a safety system, the drive control apparatus comprising:
    a detection unit that detects operating values of a drive unit including at least one of a speed, a position, acceleration, an amount of movement, a movement direction and torque, and outputs a signal indicating one or more physical parameters associated with detected operating values ("DOV") that indicate an operating state of the drive unit; and
    a cut off unit that cuts off supply of electric power to the drive unit when the one or more DOV physical parameters are outside a first upper to lower limit range;
    a safety unit that outputs, a warning when the DOV physical parameters are within the first range and additionally is outside a second upper to lower limit range, based on an input signal from the detection unit, wherein the second range is narrower than the first range, and
    wherein the warning includes information regarding whether the one or more DOV physical parameters are lower than the second lower limit range or whether the one or more DOV physical parameters are greater than the second upper limit range.

2. The drive control apparatus according to claim 1, wherein the safety unit monitors the one or more physical parameters, wherein the cutting off of the supply of electric power occurs between a period of time for which monitoring of the one or more physical parameters is effective and a period of time for which the monitoring of the physical parameter is non-effective, and the warning is output during monitoring of the one or more DOV physical parameters.

3. The drive control apparatus according to claim 1, wherein the warning is output as a warning signal.

4. The drive control apparatus according to claim 3, wherein the warning signal is as at least one of light and sound.

5. The drive control apparatus according to claim 3, wherein the warning signal is at least one of a physical signal and a logical signal.

6. The drive control apparatus according to claim 3, further comprising:
    a control unit that controls the drive unit,
        wherein the warning signal is output to the control unit, and
        the control unit limits operation of the drive unit, while permitting operation of the drive unit.

7. The drive control apparatus according to claim 3, further comprising a displaying device that receives the warning signal and displays the warning.

8. The drive control apparatus according to claim 7, wherein the warning comprises a first warning signal that is displayed on the displaying device with a first pattern of light when the one or more DOV physical parameters is within the first range and is outside the second range, and wherein the warning comprises a second warning signal that is displayed on the displaying device with a second pattern of light different from the first pattern of light, when the one or more DOV physical parameters is outside the first range.

9. The drive control apparatus according to claim 7, wherein the warning comprises a first warning signal that is displayed on the displaying device with a first pattern of light when the one or more DOV physical parameters is less than the second lower limit range, and wherein the warning comprises a second warning signal that is displayed on the displaying device with a second pattern of light different from the first pattern of light when the one or more DOV physical parameters is greater than the second upper limit range.

10. The drive control apparatus according to claim 1, further comprising a setting unit that sets the second range according to a user interface input.

11. The drive control apparatus according to claim 10, wherein the upper limit and the lower limit of the second range are set from the user interface input.

12. The drive control apparatus according to claim 11, wherein the warning is output at operation at the upper limit and the lower limit of the second range.

13. The drive control apparatus according to claim 1, wherein the warning comprises a first warning signal that is output on a speaker with a first pattern of sound when the one or more DOV physical parameters is within the first range and outside the second range, and wherein the warning comprises a second warning signal that is output on the speaker with a second pattern of sound different from the first pattern of sound, when the one or more DOV physical parameters is outside the first range.

14. The drive control apparatus according to claim 1, wherein the warning comprises a first warning signal that is output from a speaker on the displaying device with a first pattern of sound when the one or more DOV physical parameters is less than the second lower limit range, and wherein the warning comprises a second warning signal that is output from a speaker on the displaying device with a second pattern of sound different from the first pattern of sound when the one or more DOV physical parameters is greater than the second upper limit range.

* * * * *